R. D. WIRT.
HOSE RACK.
APPLICATION FILED OCT. 9, 1908.
912,928.
Patented Feb. 16, 1909.
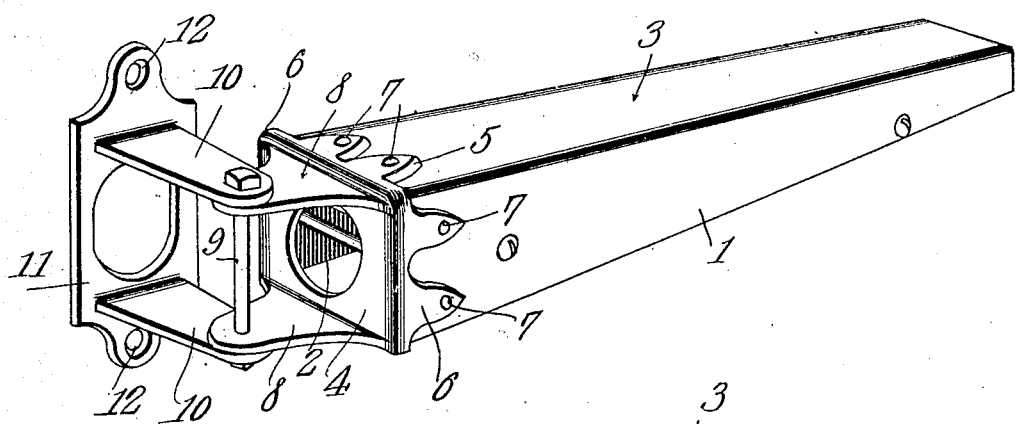
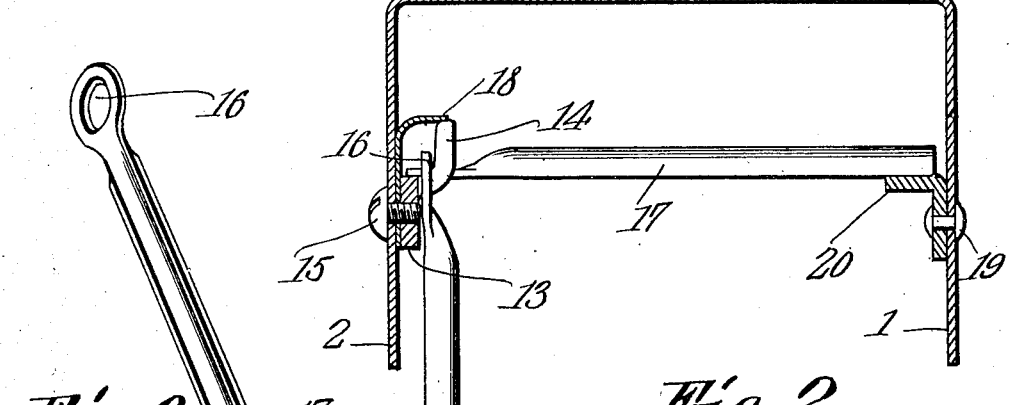
Witnesses:
F. F. Stewart
R. M. Elliott
Inventor,
Reuben D. Wirt.
By C. A. Snow & Co.
Attorneys.
THE NORRIS PETERS CO., WASHINGTON, D. C.

UNITED STATES PATENT OFFICE.

REUBEN D. WIRT, OF PHILADELPHIA, PENNSYLVANIA.

HOSE-RACK.

No. 912,928.  Specification of Letters Patent.  Patented Feb. 16, 1909.

Application filed October 9, 1908. Serial No. 457,027.

*To all whom it may concern:*

Be it known that I, REUBEN D. WIRT, a citizen of the United States, residing at Philadelphia, in the county of Philadelphia and State of Pennsylvania, have invented a new and useful Hose-Rack, of which the following is a specification.

This invention relates to that class of hose racks employing hose supporting pins or members that are pivotally connected at one end to the rack, and loosely supported at the other end by the rack in such manner as to be readily freed from such support when the hose is withdrawn from the rack.

The objects of the present invention are to improve and simplify the construction of the rack, whereby with the minimum of the metal employed to secure the maximum of strength, and also to protect the hose from dust; to improve the manner of assembling the hose supporting pins with the rack, whereby danger of disconnection or loss will be prevented; and to improve and simplify the construction of the hose supporting pins.

With the above and other objects in view, as will appear as the nature of the invention is better understood, the same consists, generally stated, in a hose rack having a body constructed from a single piece of heavy sheet metal stamped or otherwise shaped to provide two parallel arms and a top, all of the parts being imperforate, thus to protect the hose from dust. The body is approximately wedge-shaped when viewed in side elevation, and has secured to its broader end a head which is pivoted to a suitable support, either in the ends of a bracket to be secured against a wall or the like, or to a clamp to be secured to a stand or other pipe. Arranged within the body is a series of hose supporting pins, that are preferably semicircular in cross section and are provided at one end with eyes to engage hooks carried by the interior side of one of the arms, the interior side of the other arm being provided with a support upon which the free ends of the pins will rest when holding a hose suspended. In order to adapt the rack for use in connection with thick or thin hose, means is provided whereby the pins will be held assembled with the hooks when the rack is in use, or when it is being shipped. This novel means consists of a keeper that is adapted to coact with the hooks for the above purpose, the keeper being constructed preferably of resilient metal that will yield when the pins are being positioned, but will instantly spring into place when the hooks are properly positioned, and thus hold them in the hooks.

Further and more specific details of construction and points of novelty will be hereinafter fully described and claimed.

In the accompanying drawings forming a part of this specification, and in which like characters of reference indicate corresponding parts: Figure 1 is a view in perspective of a hose rack constructed in accordance with the present invention. Fig. 2 is a vertical transverse sectional view, on an enlarged scale and looking towards the smaller end of the body. Fig. 3 is an inverted perspective detail view of one of the hose supporting pins.

The body is constructed from a piece of heavy sheet metal that is stamped or otherwise shaped to present two side arms 1 and 2 that are arranged in parallelism, and a top 3, all of these parts being imperforate, thus to insure protection of the hose from dust. As shown in Fig. 1, the arms are tapered in form, with the lower edges straight, but if preferred, these edges may be curved without departing from the spirit of the invention.

At the rear or larger end of the body is arranged a head which comprises a back plate 4, herein shown as orificed, although this is not essential, and top and side plates 5 and 6, the plates being secured to the exterior of the body by rivets 7. The back plate carries two spaced ears 8 that are pivotally connected by a bolt 9 with two arms 10 that project from a plate 11 that is designed to be secured to a wall or other suitable support by screws or bolts (not shown), that are passed through orifices 12 provided at the terminals of the plate 11.

Secured to the inner side of the arm 2 is a bar 13 from which projects upward curved hooks 14 that are preferably, though not necessarily, integral with the bar, the bar being held assembled with the arm by screws or rivets 15. The hooks are engaged by the eyes 16 of the hose supporting pins 17, which as shown in Fig. 3, are approximately semicircular in cross section and are stamped up from heavy galvanized sheet iron, brass or other non-corrodible material. As above stated, it is one of the objects of the present invention to construct the rack in such manner as to support hose of any thickness, and also to prevent disconnection of the hose supporting pins from the hooks 14. To secure this result, there is a keeper 18 employed, which is constructed from a strip of resilient sheet metal clamped between the bar 13 and the arm 2 by the screws 15, which pass through the keepers. The upper end of the keeper is curved over to rest upon the upper ends of the hooks, and thus in a positive manner holds the pins from disconnection therefrom. It is designed that the keeper 18 will readily yield to pressure when the pins are to be positioned, but will present such resistance to yielding as to secure the object sought by its employment. It will be observed by reference to Fig. 2 that it is immaterial how far the points of the hooks are from the top 3, as the keeper will be as positive in holding the pins assembled with the hooks as if their terminals bore against the under side of the top. From this arrangement it will be seen that the rack can be made to support either thick or thin hose without any change in the structural arrangement other than varying the positioning of the orifices to receive the screws 15.

Secured to the inner side of the arm 1 by screws or rivets 19 is a bar 20, that is made from angle iron or any other suitable material, and constitutes a support for the free ends of the pins 17, as clearly shown in Fig. 2. As will be obvious, the position of this bar will be shifted to make its upper face occupy the proper plane with relation to the upper face of the bar 13, upon which the under sides of the eyes rest, thus to occupy a horizontal position. As is usual with constructions of this character, the hose (not shown) is looped or draped around the successive pins, and when the hose is to be used, upon an outward pull being applied thereto, the successive pins 17 will be moved off of the support 20 and assume the position shown in Fig. 2, thus freeing the hose without danger of kinking or tangling.

The improvements herein described while simple in character will be found thoroughly efficient for the purposes designed, and will coact in the production of a durable, efficient, and thoroughly reliable form of hose rack. Moreover, by constructing the body of the rack in the manner described, the cost of production is materially lessened, as less metal will be employed, and this latter feature will also be of advantage, as it will render the rack as a whole less cumbersome.

I claim:—

1. A hose rack provided with a plurality of hooks, hose supporting pins engaging the hooks, and a keeper coacting with the hooks to retain them in place against accidental separation.

2. A hose rack provided with a plurality of hooks, hose supporting pins engaging the hooks, and a resilient keeper disposed over the ends of the hooks.

3. The combination with a hose rack, of a bar secured thereto and provided with a plurality of hooks, a resilient keeper having one end curved to overlie the hooks, and hose supporting pins engaging the hooks.

4. A hose rack comprising a body constructed from a single piece of sheet metal shaped to provide two imperforate side arms and a top, means secured to the body to attach it to a suitable support, a bar secured to the interior of one of the arms and provided with a plurality of hooks, hose supporting pins engaging the hooks, a keeper disposed over the hooks, and a support secured to the interior of the other arm with which the free ends of the pins engage.

In testimony that I claim the foregoing as my own, I have hereto affixed my signature in the presence of two witnesses.

REUBEN D. WIRT.

Witnesses:
F. M. HOFFMAN,
G. B. HOFFMAN.